April 5, 1966   G. F. RITTER, JR., ETAL   3,244,338
APPARATUS FOR CUTTING SHEETS OF GLASS
Filed May 25, 1960   3 Sheets-Sheet 1
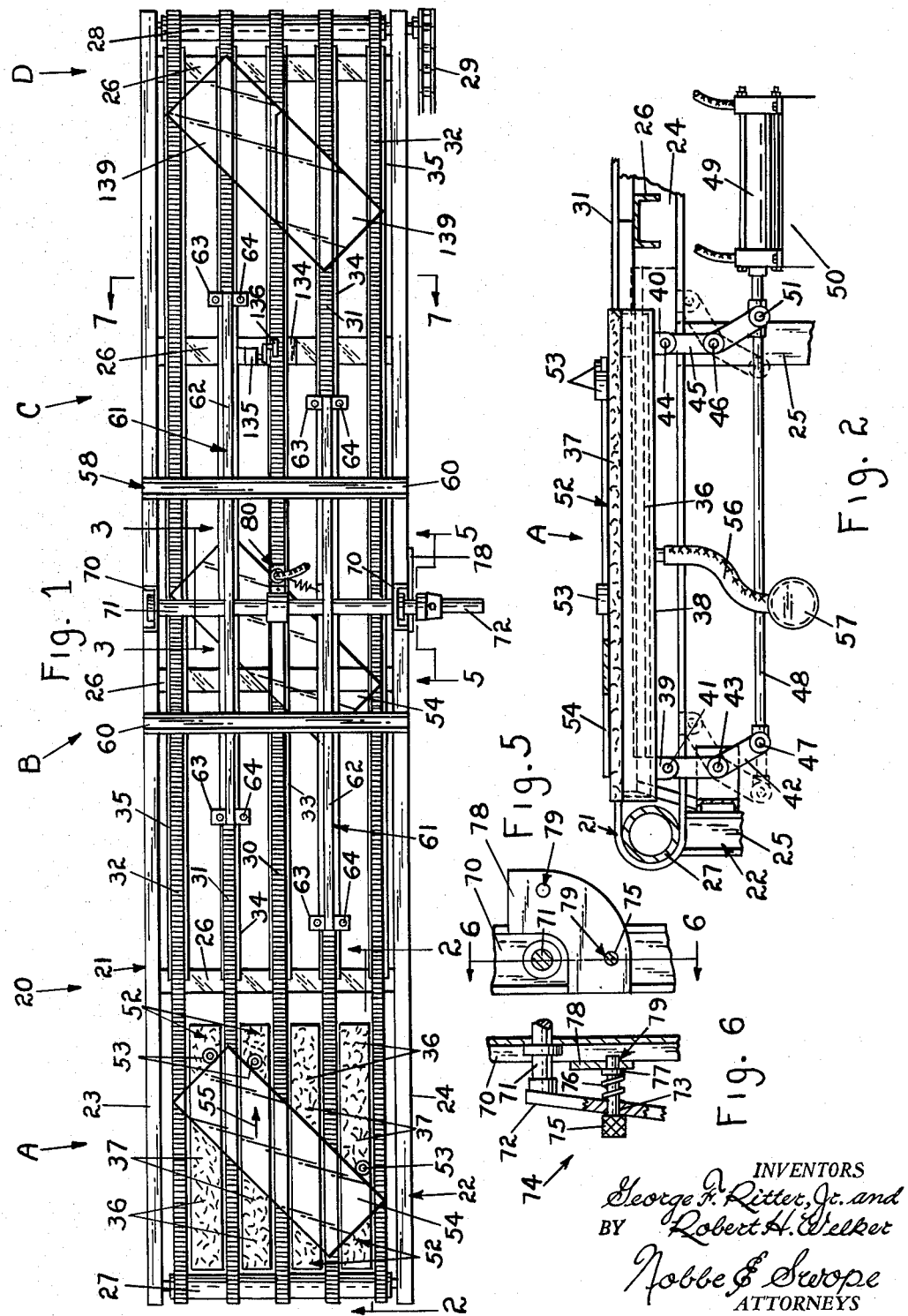
INVENTORS
George F. Ritter, Jr. and
BY Robert H. Welker
Nobbe & Swope
ATTORNEYS April 5, 1966 G. F. RITTER, JR., ETAL 3,244,338
APPARATUS FOR CUTTING SHEETS OF GLASS
Filed May 25, 1960 3 Sheets-Sheet 2
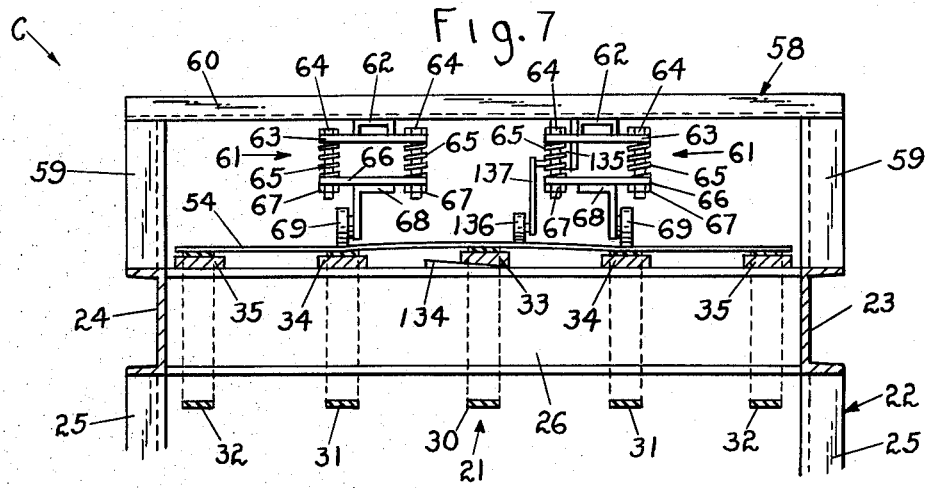
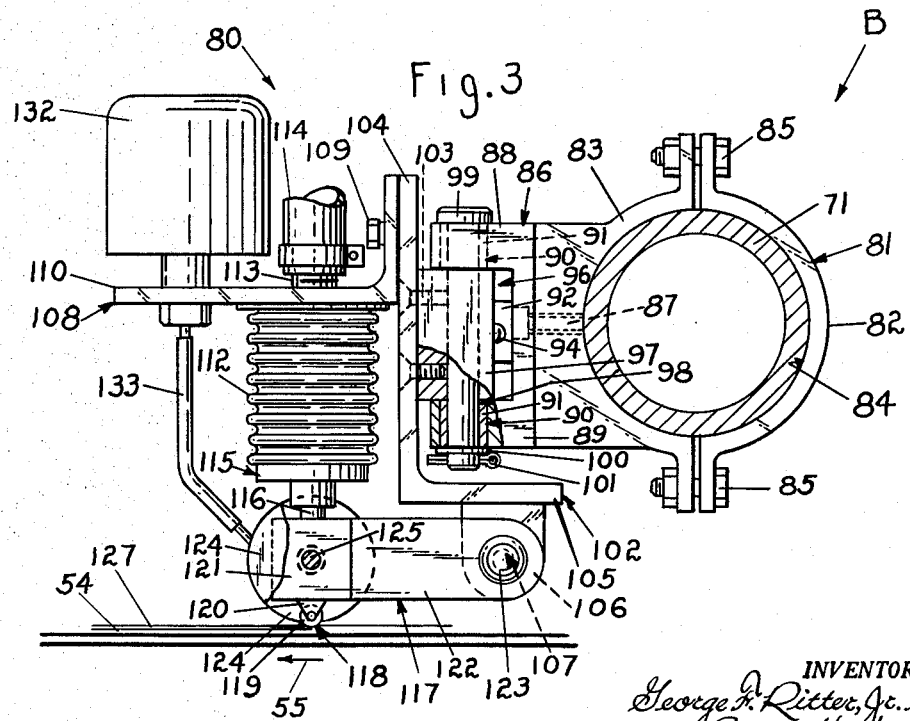
INVENTORS
George F. Ritter, Jr. and
BY Robert H. Welker
Nobbe & Swope
ATTORNEYS April 5, 1966   G. F. RITTER, JR., ETAL   3,244,338
APPARATUS FOR CUTTING SHEETS OF GLASS
Filed May 25, 1960   3 Sheets-Sheet 3

INVENTORS
George F. Ritter, Jr. and
BY Robert H. Welker
Nobbe & Swope
ATTORNEYS

United States Patent Office 3,244,338
Patented Apr. 5, 1966

3,244,338
APPARATUS FOR CUTTING SHEETS OF GLASS
George F. Ritter, Jr., Toledo, and Robert H. Welker, Perrysburg, Ohio, assignors to Libbey-Owens-Ford Glass Company, Toledo, Ohio, a corporation of Ohio
Filed May 25, 1960, Ser. No. 31,593
14 Claims. (Cl. 225—96.5)

The present invention relates broadly to the cutting of sheets of glass and more particularly to a method and apparatus for cutting rectilinear sheets of glass at an oblique angle.

It is a primary object of this invention to provide an improved method and apparatus for splitting a rectilinear sheet of glass into two substantially identical trapezoidal portions.

Another object of this invention is to provide a method and apparatus for cutting rectilinear sheets of glass in which the scoring tool is normal to the leading edge of the sheet at the time of initial contact therewith and is then swung horizontally about a vertical axis to complete the cutting of the sheet at an oblique angle.

A further object of this invention is to provide novel apparatus for scoring a glass sheet in the above manner as said sheet is carried along a definite horizontal path.

Other objects and advantages of the invention will become more apparent during the course of the following description when taken in connection with the accompanying drawings.

In the drawings wherein like numerals are employed to designate like parts throughout the same:

FIG. 1 is a plan view of apparatus for cutting sheets of glass constructed in accordance with the invention;

FIG. 2 is a longitudinal section of that portion of the apparatus upon which the glass sheets to be cut are loaded, taken on line 2—2 of FIG. 1;

FIG. 3 is a side elevation of the cutter head as viewed along line 3—3 of FIG. 1;

FIG. 5 is a sectional view of the mounting means for the cutter head taken on line 5—5 of FIG. 1;

FIG. 6 is a sectional view taken on line 6—6 of FIG. 5;

FIG. 7 is a cross-sectional view taken on line 7—7 of FIG. 1 showing the apparatus for breaking the sheet along the scored line.

Figure 8:
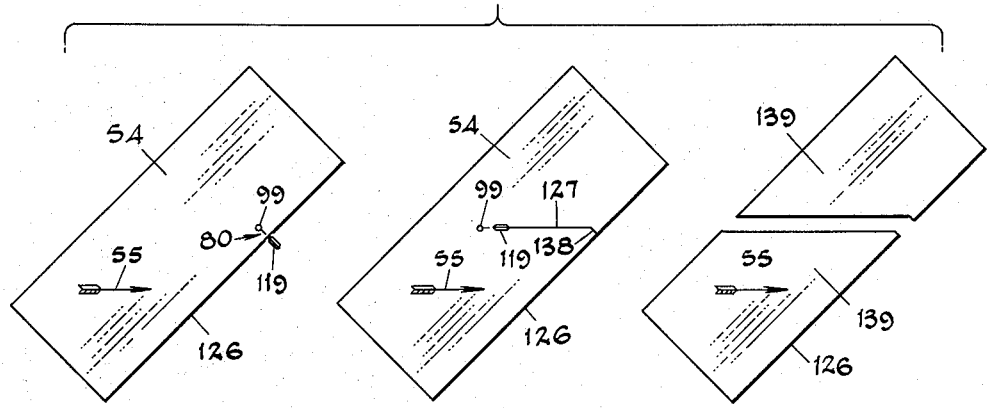
FIG. 8 is a diagrammatic view progressively illustrating the steps in the cutting procedure.

Referring now to the drawings and particularly to FIG. 1, the cutting apparatus is indicated generally by the numeral 20 and which, according to functions, is divided into a loading section A, a cutting or scoring section B, a breaking section C and an unloading section D. All five sections are traversed by a multiple belt type conveyor 21 moving in a rectilinear path.

The conveyor 21 comprises a supporting framework 22 which includes longitudinal side rails 23 and 24 supported above the floor level by uprights 25 (FIGS. 2 and 7) and connected together in spaced parallel relation by cross members 26.

Journaled for rotation in the side rails 23 and 24 at the loading end of the conveyor 21 is a roll 27 and a second roll 28 is journaled in said side rails at the unloading end of the conveyor. The roll 28 extends through the side rail 24 and is provided with a chain drive 29 which is driven from a suitable motor or line shaft.

The conveyor 21 is made up of a plurality and, as herein shown, five narrow, endless belts which are passed over the rolls 27 and 28 and supported on the upper flight by a plurality of slats. The belt on the longitudinal center line of the conveyor is designated by the numeral 30, the belt on either side of the center belt 30 by the numeral 31, and the belt adjacent each of the side rails 23 and 24 by the numeral 32. In a similar manner, the center slat is designated by the numeral 33, the slats adjacent the center slat by the numeral 34 and the slats adjacent the side rails 23 and 24 by the numeral 35.

The loading section A of the conveyor 21 is provided with a plurality of elongated air chambers 36, individually positioned side-by-side between adjacent belts 30, 31 and 32 and each chamber being covered with an air permeable and resilient top 37 made of felt or other material having suitable characteristics.

As an alternate construction, a single air chamber, with recesses in the top surface to provide clearance for the upper flights of the belts 30, 31 and 32, may be substituted for the plurality of chambers.

Projecting downwardly from the bottom wall 38 of each chamber 36 at opposite ends thereof are lugs 39 and 40. Each lug 39 is pivotally connected by a pin 41 to one end of a bell crank lever 42 and each bell crank lever 42 is pivotally mounted on a transverse rod 43 supported by the framework 22 of the conveyor 21. Each of the lugs 40 is similarly connected by a pin 44 to one end of a bell crank level 45 and each bell crank lever 45 is pivotally mounted on a transverse rod 46 supported by a pair of transversely opposed uprights 25 forming part of the framework 22. The lower end of each bell crank lever 42 is pivotally joined by a rod 47 to the terminal end of a horizontal piston rod 48, the opposite end of which is received within a double acting, pneumatic cylinder 49 which is mounted on a base 50. The lower end of each bell crank 45 is also pivotally connected to the piston rod 48 at a point adjacent the cylinder 49 by a rod 51.

As shown in FIG. 2, extension of the piston rod 48 moves the bell crank levers 42 and 45 from the solid line position, where the upper surfaces 52 of the chambers 36 form a table top above the upper flight of the conveyor belts 30, 31 and 32, to the broken line position where the upper surfaces 52 of the chambers 36 are lowered to a position where they are below the upper flight of the belts. Three or more sheet locator discs 53, which are preferably of a resilient material, project above the upper surfaces 52 of the chambers 36 and are so positioned that when two edges of a sheet of glass 54 are in engagement with the discs, the glass sheet to be cut is resting on the surfaces 52, with the angle included between the lead edge of the sheet and the direction in which the belts 30, 31 and 32 are moving, as indicated by the arrow 55 (FIG. 1), is substantially 45°.

As shown in FIG. 2, each chamber 36 is connected by a hose 56 to a manifold 57 which is continuously supplied with air under low pressure from a suitable source. The air escapes from the chambers 36 through the felt tops 37 to lessen the impact when a glass sheet 54 is placed upon the upper surfaces 52 forming the aforementioned table top. In addition, the air flotation buoys the sheet sufficiently so that an operator experiences little difficulty in accurately positioning the sheet with respect to the discs 53.

That portion of the cutting apparatus 20 forming the cutting or scoring section B and the breaking section C occupies the central portion of the conveyor 21 and includes a glass breaking apparatus which is supported on a bridge 58 spanning the conveyor substantially intermediate its ends (FIGS. 1 and 7). The bridge 58 includes four uprights 59 rising from the side rails 23 and 24 in transversely aligned pairs and with each pair of uprights supporting a cross channel 60.

A pressure bar assembly 61 is attached to the underside of the cross channels 60 directly over each of the conveyor belts 31 and slats 34. Each pressure bar assembly is comprised of a longitudinal channel 62 having a plate 63 welded or otherwise fixed to the underside thereof at opposite ends and projecting beyond the sides of the channel 62. Each plate 63 is provided with a hole at either side of the channel 62 and the body portion of a headed bolt 64 is passed through each hole, through a helically coiled spring 65, and through a hole in a second plate 66, which is identical to and parallel with the plate 63. A nut 67 engages threads on the lower end of each bolt 64 to limit the downward or pressure applying movement of the lower plate 66. The lower plates 66, at opposite ends of each pressure bar assembly 61, are joined by an angle iron 68, welded or otherwise fixed to the underside of said plates and which carries a plurality of rollers 69 for exerting a downwardly directed pressure upon the upper surface of a glass sheet as it moves thereunder on the conveyor 21.

As shown in FIG. 1, the adjacent ends of the pressure bar assemblies 61 are aligned at the 45° angle corresponding to the positioning of each sheet 54 at the loading section A and it will also be noted that the pressure bar assemblies engage the upper surface of each sheet as it traverses both the cutting section B and the breaking section C.

The apparatus comprising the cutting or scoring section B is shown in detail in FIGS. 1 and 3 through 6, and the manner in which it functions is diagrammatically illustrated in FIG. 8. As shown in FIG. 1, a pair of vertical posts 70, preferably made of channel iron, rise from the side rails 23 and 24 and rotatably support the opposite ends of a tube or rod 71 extending transversely above the conveyor 21. One end of the tube 71 projects beyond the framework 22 of the conveyor 21 and has attached thereto a hand crank 72 (FIGS. 1 and 6). As shown in detail in FIG. 6, the crank 72 is provided with an opening 73 through which is inserted a detent 74 comprised of a headed pin 75 and a spring 76 retained on the pin by a collar 77. A plate 78 is fixed to the adjacent post 70 and is provided with a pair of holes 79 radially aligned with the detent 74 and approximately 90° apart (FIG. 5).

Figure 4:
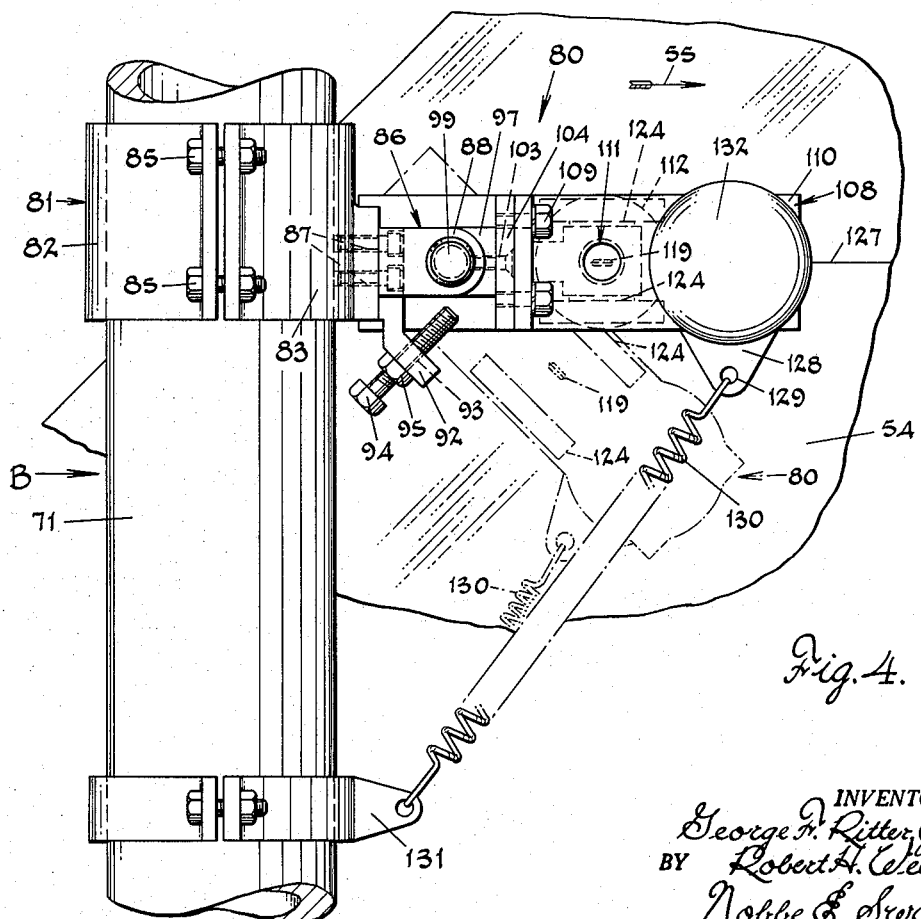
FIG. 4 is a plan view of the cutter head shown in FIG. 3.

Carried by the tube 71 on the longitudinal center line of the conveyor 21, which is directly above the center belt 30 and the center slat 33, is a cutter or scoring head 80 which is shown in detail in FIGS. 3 and 4. The cutter head is secured to the tube 71 by a clamping device 81 which is comprised of two parts 82 and 83 which, when fitted together around the tube 71, remain slightly spaced apart, but which define a surface 84 for gripping the exterior of the tube 71 when the bolt and nut combinations 85 are tightened.

Carried by the clamp 81 is a yoke 86 fastened thereto by screws 87 and provided with aligned upper and lower lugs 88 and 89 projecting away from the tube 71. A pair of holes 90 extend in vertical alignment through both lugs and each is provided with a bearing 91. A third lug 92 projects from one side of the yoke 86 at a point approximately midway between the lugs 88 and 89 and with the faces thereof at an angle of 45° with respect to the axis of the tube 71 (FIG. 4). An internally threaded opening 93 extends through the lug 92 and receives a screw 94 which is provided with a jam nut 95 for locking the screw in a preselected position.

Positioned in the space 96 (FIG. 3) between the lugs 88 and 89 of yoke 86 is a block 97 provided with a hole 98 aligned with the bores of the bearings 91 carried by said lugs. A headed pin 99, passing through the bearings 91 and block 97 and provided at its lower end with a washer 100 and a cotter key 101, retains the block 97 in pivotal relation with the yoke 86 within the limits permitted by the screw 94. An L-shaped bracket member 102 is secured to the outer vertical face of the block 97 by screws 103 passing through the vertical leg 104 of the bracket 102 while the horizontal leg 105 of the bracket 102 extends rearwardly in the direction of the tube 71 beneath the yoke 86.

Depending from the undersurface of the horizontal leg 105 of the bracket 102 is a lug 106 provided with an opening 107. A right-angled bracket 108 is fastened to the upper end of the vertical leg 104 of the bracket 102 by screws 109 and extends in a horizontal direction away from the tube 71 to provide a horizontal leg 110. As shown in FIG. 4, a threaded opening 111 extends through the horizontal leg 110 of bracket 108 and communicates with the interior of a sylphon bellows 112 carried by and depending from the underside of the horizontal leg 110 of bracket 108. A nipple 113 is screwed into the opening 111 in bracket 108 and an air hose 114 is clamped to the nipple for a purpose to be hereinafter described. The bellows 112 is closed at the bottom and thereof by a plate or plug 115 which is reduced in diameter at its lowermost end, as indicated by the numeral 116 in FIG. 3.

A carrier 117 for the cutting or scoring tool 118, which includes the usual wheel 119 and holder 120, is provided with a solid body portion 121 in which the scoring tool 118 is inserted from the bottom, and a horizontally extending bifurcated portion 122 which is pivoted on a pin 123 extending through the hole 107 of the lug 106. As air pressure is applied through the hose 114 and the nipple 113 into the interior of the bellows 112, the bellows extend in length and pivot the carrier 117 in a counter-clockwise direction (FIG. 3) to press the scoring wheel 119 against the upper surface of a sheet of glass 54 moved thereunder by the conveyor 21. However, in order to raise the scoring wheel in advance of its contact with the sheet and also limit the depth of cut to approximately 1/64", a pair of rollers 124 are mounted by shoulder screws 125 on either side of the body portion 121 of the carrier 117 to contact the lead edge 126 of a sheet 54 in advance of the scoring wheel 119 and serve to raise the scoring wheel a predetermined amount. By regulating the air pressure to the interior of the bellows 112, the scoring wheel 119 and the rollers 124 which control the depth of the score line 127 are held out of contact with the conveyor belt 30 when not engaging a sheet.

As shown in FIG. 4, the horizontal leg 110 of the bracket 108 has a projection 128 on the same side as the lug 92 of the yoke 86. A hole 129 is provided in the projection 128 to receive one end of a tension spring 130 which is anchored to the tube 71 by a clamp 131. The spring 130 exerts only sufficient tension to pivot the cutter head 80 about the pin 99 to the broken line position of FIG. 4, which is accurately determined by the screw 94.

A lubricant storage and feed container 132 is mounted on the end of the horizontal leg 110 of the bracket 108 and leading therefrom is a tube 133 which directs the lubricant onto the upper surface of the glass sheet 54 at the point of contact with the scoring wheel 119.

Referring now to FIGS. 1 and 7, a wedge 134 is inserted between the cross member 26 and the center slat 33 at the breaking section C to raise the center slat 33 and the belt 30. In the same area is a switch 135 having a roller 136 for contacting the upper surface of each sheet 54 and a lever 137 mounting the roller. The switch 135 is electrically connected to operate a solenoid valve which controls the air flow into the double acting cylinder 49 to raise and lower the air chambers 36.

With the conveyor 21 operating, the circuit to the switch 135 is energized, and air pressure is applied to the chambers 36, the cutter head 80 and the rear end of the cylinder 49. At this time the air chambers 36 are in the lowered or broken line position of FIG. 2 and the cutter head 80 is biased by the spring 130 against the screw 94 in the broken line position shown in FIG. 4.

An operator at the unloading section D of the apparatus 20 then manually trips and holds the switch 135 to admit air into the front end of the cylinder 49 thereby raising the air chambers 36 from the broken line position to the full line position shown in FIG. 2. A glass sheet 54 to be cut is then placed upon the upper surfaces of chambers 36 in a diagonal position, as shown in FIG. 1, with the leading corner of the sheet being positioned between and engaging the spaced locators 53 on the two chambers 36 positioned at either side of the conveyor belt 31 so that one locator engages the forward longitudinal edge of the sheet and the other locator the adjacent end edge thereof. At the same time, the forward longitudinal edge of the sheet at the opposite end thereof is moved into contact with the locator 53 carried by chamber 36 at the opposite side of the conveyor.

After placement of the glass sheet upon the top surfaces 52 of the air chambers 36 by a second operator, the operator at the unloading section D then releases the switch 135 whereupon the chambers 36 will move downwardly by their own weight to transfer the sheet 54 onto the belts 30, 31 and 32 in the desired angular position. Thus, the locators 53 serve to accurately position each sheet on the air chambers 36. In addition, the felts 37 pad the surface 52 and permit passage of air to buoy the sheets for ease in positioning. The air flotation also retards the fall of the trailing edge of the sheet, when released by an operator.

The sheet 54 is then advanced from the loading section A in the direction of the arrow 55 and is engaged on its upper surface by the rollers 69 of the pressure bar assemblies 61. Prior to arrival of the sheet at the scoring section B, the scoring head 80 is held in the broken line position of FIG. 4 by the tension spring 130. In this position, the scoring wheel 119 is normal to the approaching or lead edge 126 of the sheet 54, as shown diagrammatically in the view at the left of FIG. 8. The scoring wheel 119 is retained in this position at the time of contact with the lead edge 126 of the sheet 54 and for a short distance over the surface of the sheet by the tension spring 130. In other words, the initial part of the score line is normal to the lead edge 126 of the sheet as indicated by the numeral 138 in the central view of FIG. 8. However, at this time, with the scoring wheel 119 and the rollers 124 held in engagement with the surface of the sheet by the bellows 112, the frictional force imparted to the scoring wheel 119 and the rollers 124 by the movement of the sheet in the direction of the arrow 55 is sufficient to overcome the tension of spring 130, and the cutting head 80 is pivoted about the pin 99 to the solid line position shown in FIG. 4, which coincides with the line of travel of the sheet 54 as indicated by the arrow 55 and as shown in FIG. 8. It has been found that by making the initial score normal to the lead edge of the sheet, the resulting break is sharp, whereas without this feature the break is ragged and may not properly follow the score line.

As each sheet 54 is advanced by the conveyor 21, the cutter head 80, upon completion of a score line 127, is returned to the broken line position of FIG. 4 by the spring 130. The pressure bar assemblies 61 press each sheet 54 firmly against the belts 30, 31 and 32 during the scoring operation and prevent the sheet 54 from shifting.

The pressure on each sheet 54 is retained as the sheet is advanced by the conveyor 21 into the breaking section C. As previously disclosed, the wedge 134 inserted between the cross member 26 and the center slat 33 raises the center belt 30, which underlies the score line 127 to bend the sheet 54 sufficiently to break it along the score line into two substantially identical trapezoidal shaped portions or sheets of glass 139 (FIGS. 1 and 8).

Simultaneously with the breaking of the sheet 54, the sheet engages the switch 135 and energizes an electrical circuit which admits air into the front or left-hand end of the cylinder 49, as viewed in FIG. 2, thereby retracting the piston rod 48 and raising the chambers 36 to the full line position of FIG. 2 where the surfaces 52 of the chambers are above the level of the upper flights of the belts 30, 31 and 32. During the time the switch 135 is held energized, the air chambers are maintained in the raised, full line position of FIG. 2 for a period of time sufficient for an operator to load another sheet 54. The elapsed time a sheet 54 is in engagement with the roller 136 of the switch 135 is sufficient for an operator to load another sheet on the surfaces 52 of the chambers 36.

After emergence of a sheet 54 from the breaking section C and release of the two trapezoidal sheets 139 from the pressure bar assemblies 61, the sheets 139 are advanced to the unloading section D of the conveyor 12 where they are removed by an operator.

The crank 72 and detent 74, previously disclosed, are provided for changing the scoring tool 118. When the crank and the detent are in the position shown in FIGS. 5 and 6, the cutting head 80 is in the operative position shown in FIGS. 3 and 4. When the scoring wheel 119 becomes dulled, an operator withdraws the detent 74 from the lower hole 79, rotates the crank 72 one quarter turn in a counter-clockwise direction and releases the detent into the higher hole 79. After changing the scoring tool 118, this operation is reversed to restore the head 80 to scoring position.

It is to be understood that the form of the invention herewith shown and described is to be taken as a preferred embodiment of the same, and that various changes in the shape, size and arrangement of parts may be resorted to without departing from the spirit of the invention.

We claim:
1. In apparatus for bisecting a rectilinear sheet of glass into two trapezoidal portions, a conveyor for carrying said sheet along a definite horizontal path, means for positioning a sheet of glass to be cut on said conveyor, with the bisection line coincident with the longitudinal axis of said conveyor, cutting means including a rotatable scoring wheel mounted above said conveyor, means for pivotally mounting said cutting means to swing about a vertical axis, and means for resiliently biasing said cutting means about said axis so that the scoring wheel is normal to the leading edge of the sheet when initially contacted thereby.

2. In apparatus as defined in claim 1, in which said conveyor includes a plurality of endless belts arranged in spaced parallel relation along the longitudinal axis of said conveyor.

3. In apparatus as defined in claim 2, in which the means for positioning the sheet on said conveyor includes a plurality of air flotation chambers positioned in spaced relation opposite one another and between said endless belts, and means for raising said chambers above the surfaces of the belts to receive the glass sheet thereon and for then lowering said chambers to position the sheet on the belts.

4. In apparatus as defined in claim 3, including locating means carried by certain of said chambers and engageable by said sheet to locate the sheet in position thereon.

5. In apparatus as defined in claim 4, in which said sheet locating means comprises a plurality of locators projecting above the upper surfaces of the chambers for engaging two adjacent edges of the sheet.

6. In apparatus as defined in claim 1, in which said cutting means includes rollers rotatable about a horizontal axis and adapted to engage the upper surface of the sheet to limit the depth of cut of the scoring wheel.

7. In apparatus as defined in claim 6, including means for applying pressure to said scoring wheel and rollers to create a frictional force between the sheet and said scoring wheel and rollers sufficient to overcome the resilient biasing means upon continued forward movement of the sheet and cause said cutting means to swing in the opposite direction to bring the scoring wheel into alignment with the path of travel of the conveyor when both the scoring wheel and rollers are in contact with the upper surface of the sheet.

8. In apparatus as defined in claim 7, including means for breaking the sheet along the score line upon continued movement thereof by said conveyor.

9. In apparatus as defined in claim 8, in which said breaking means includes means for applying a downwardly directed pressure upon the upper surface of said sheet along either side of said score line.

10. In apparatus as defined in claim 9, in which the means for breaking the sheet includes means for elevating the endless belt beneath the score line above the level of the endless belts at opposite sides of said score line.

11. In apparatus as defined in claim 3, in which the means for raising and lowering the air flotation chambers relative to the endless belts includes hydraulic means, and a switch located in the path of said sheet and actuated thereby to effect the operation of said hydraulic means.

12. Apparatus for severing a glass sheet along a line oblique to a rectilinear edge thereof comprising, in combination, a conveyor for carrying the sheet along a predetermined path, means for positioning the sheet on said conveyor with the line of severance parallel to the longitudinal axis of the conveyor and with said rectilinear edge leading, scoring means mounted above said sheet so as to pivot about a vertical axis offset therefrom, and resilient means urging said scoring means into a position with the line between said vertical axis and said scoring means normal to said leading edge of the advancing sheet upon initial contact therewith.

13. Apparatus as claimed in claim 12, in which said scoring means includes a bracket mounted to pivot about said vertical axis, a carrier pivotally secured to said bracket so as to swing in a vertical arc, a scoring tool detachably carried by said carrier, said scoring tool including a rotatably mounted scoring wheel and a pair of rollers of larger diameter than said scoring wheel mounted with their axis above said scoring wheel, said rollers being adapted to engage the upper surface of the sheet so as to raise said scoring wheel as the leading edge of the sheet approaches and limit the depth of the score mark formed in said sheet.

14. Apparatus as claimed in claim 13, including means for applying pressure to said pivotally mounted carrier to press said scoring wheel and rollers into engagement with said sheet with sufficient force so that after forming an initial score mark normal to said leading edge, upon continued advancement of said sheet said scoring wheel and rollers swing about said vertical axis to score said sheet parallel to the longitudinal axis of the conveyor along said oblique line of severance, and means for flexing said sheet along said score line in response to further advancement thereof to sever said sheet.

References Cited by the Examiner

UNITED STATES PATENTS

| | | | |
|---|---|---|---|
| 1,511,016 | 10/1924 | Barker | 49—48 |
| 1,762,575 | 6/1930 | Fowler | 49—48 |
| 1,834,120 | 12/1931 | Callard et al. | 49—77 |
| 1,972,210 | 9/1934 | Waldron | 225—96.5 |
| 1,988,565 | 1/1935 | Owen | 49—48 |
| 2,042,819 | 6/1936 | Allison | 225—98 |
| 2,125,922 | 8/1938 | Hopfield | 49—77 |
| 2,395,376 | 2/1946 | Long | 49—48 X |
| 2,508,017 | 5/1950 | Echter et al. | 49—77 |
| 2,612,689 | 10/1952 | Kirkman et al. | 49—48 X |
| 2,693,053 | 11/1954 | Eakin | 49—48 |
| 2,756,545 | 7/1956 | Atkeson | 49—48 |
| 2,785,928 | 3/1957 | Hanson | 302—29 X |
| 2,918,183 | 12/1959 | Petersen | 302—29 |
| 2,948,991 | 8/1960 | Walters et al. | 225—96.5 |
| 3,044,216 | 7/1962 | Billinger | 225—96.5 |

References Cited by the Applicant

UNITED STATES PATENTS

| | | |
|---|---|---|
| 2,560,305 | 7/1951 | Ramain. |
| 2,705,390 | 4/1955 | Denlow. |

WILLIAM W. DYER, Jr, *Primary Examiner.*

ARTHUR P. KENT, LOUIS J. DEMBO, *Examiners.*